United States Patent [19]

Imahashi et al.

[11] Patent Number: 4,525,659
[45] Date of Patent: Jun. 25, 1985

[54] POSITIONING STAGE HAVING A VIBRATION SUPPRESSOR

[75] Inventors: Issei Imahashi, Yamanashi; Teruo Asakawa, Nirasaki, both of Japan

[73] Assignee: Telmec Co., Ltd., Nirasaki, Japan

[21] Appl. No.: 429,278

[22] Filed: Sep. 30, 1982

[30] Foreign Application Priority Data

Oct. 20, 1981 [JP] Japan .................................. 56-168206

[51] Int. Cl.³ .............................................. B64C 17/06
[52] U.S. Cl. ....................................... 318/649; 318/611
[58] Field of Search ............... 318/648, 649, 689, 630, 318/653, 611, 640, 623, 687, 612; 324/125; 248/562, 563, 566, 638

[56] References Cited

U.S. PATENT DOCUMENTS

| | | | |
|---|---|---|---|
| 3,736,880 | 6/1973 | Ross | 318/649 X |
| 3,889,164 | 6/1975 | Nishizawa | 318/687 X |
| 3,936,716 | 2/1976 | Bos | 318/649 X |
| 4,021,716 | 5/1977 | Rue | 318/689 X |
| 4,222,270 | 9/1980 | Allen | 318/648 X |
| 4,382,216 | 5/1983 | Joseph | 318/648 X |

OTHER PUBLICATIONS

Elgerd, Olle I., Basic Electric Power Engineering, Addison-Wesley Publ. Co., Mass., 1977, pp. 300-301.

Primary Examiner—William M. Shoop
Assistant Examiner—Patrick C. Keane
Attorney, Agent, or Firm—Price, Heneveld, Huizenga & Cooper

[57] ABSTRACT

A first stage adapted to be moved in predetermined directions by a first driving device is provided in a machine base supported from a foundation by an intermediary of resilient means. This first stage is provided a second stage adapted to be moved in the directions at right angles to the directions of movement of the first stage by a second driving device. Upon movement of these respective stages, vibration of the machine base is excited by reaction forces exerted upon the machine base as a result of acceleration and deceleration. These reaction forces are offset by resistive forces generated by first and second force generators respectively. The first and second force generators establish an electromagnetic coupling between the foundation and the machine base. The first force generator is made to act against the first driving device, and the second force generator is made to act against the second driving device, in such manner that the first and second force generators generate forces directed in the opposite directions to and having substantially the same magnitudes as the reaction forces exerted upon the machine base by the first and second driving devices, respectively. This occurs simultaneously with energization of the corresponding driving devices and effectively suppresses vibration of the machine base.

1 Claim, 8 Drawing Figures

*Prior Art*

POSITIONING STAGE HAVING A VIBRATION SUPPRESSOR

BACKGROUND OF THE INVENTION

The present invention relates to a positioning stage having a vibration suppressor, which is used in an apparatus for manufacturing semiconductor products, an inspection apparatus for semiconductors, and various precise measuring apparatus.

In recent years, a positioning stage having a high precision (for instance, a positioning precision of 0.1 microns or less) has been employed in various manufacturing apparatus and inspection apparatuses of semiconductor products. A positioning stage of such type which has been heretofore used, is generally constructed, for instance, as illustrated in FIGS. 1 to 3.

In these figures, reference character a designates a foundation, a machine base c is provided above this foundation a by the intermediary of resilient means b, and further, on this machine base c a first stage d is provided so as to be movable in predetermined directions (the directions indicated by arrows Ad). Reference character e designates a first driving device for moving the first stage d, and in general, a servomotor is used therefor. In addition, reference character f designates a screw shaft which engages the first stage d to move the same. The shaft rotated by the servomotor e and is constrained so as to be not movable in the axial direction but to be allowed only to rotate. Reference character g designates rails along which the first stage d can slidably move. Furthermore, reference character h designates a second stage provided on the first stage d so as to be movable along rails k in the directions at right angles to the directions of movement of the first stage d. Reference character i designates a second driving device provided on the first stage for moving the second stage h, which is similar to the first driving device e provided on the machine base c, and reference character j designates a screw shaft formed in the same manner as the screw shaft f. The above-mentioned resilient means b is, for example, an air spring, and the purpose of providing such resilient member b is to prevent vibration from being transmitted from the ground surface l to the respective stages d and h.

In order to move the first stage d on the machine base c, a force is applied to the first stage d by means of the first driving device e to accelerate the first stage d, or in order to stop the first stage d, a force directed in the opposite direction is applied to the first stage d by means of the first driving device e to decelerate the first stage d. In this case, a reaction force for the force exerted upon the first stage for acceleration or deceleration, is exerted upon the machine base c. Since the machine base c is supported by the intermediary of the resilient means b, when it is applied with the reaction force of acceleration or deceleration, it moves in the opposite direction to or in the same direction as the direction of movement of the first stage d. In this way, during the period when the first stage is being accelerated or decelerated, the machine base c is displaced to a position that is different from its original position, although the displacement is very small. When this acceleration or deceleration has been terminated, the reaction force exerted upon the machine base c would disappear, and therefore, the resilient means b tends to restore from its resiliently deformed state towards its original unstrained state. Hence, as will be obvious from the theory of mechanical vibration, vibration having a vibration characteristic determined by the mass of the machine base c and the mechanical structure mounted thereon and the elastic constant of the resilient means b, would be excited. In this way, after the first stage d has been moved (that is, acceleration and deceleration has been finished), vibration is excited in the machine base c, and since this vibration sustains even after stoppage of the first stage d, this phenomenon would be harmful for the apparatus provided with the positioning stages.

The above-mentioned vibration-exciting phenomenon occurs similarly with respect to the second stage h also, that is, as a result of movement of the second stage h, vibration is excited in the machine base c via the first stage d, the direction of vibration being at right angles to the direction of the vibration excited by the movement of the first atage d, and this phenomenon would be also harmful for the apparatus provided with the positioning stage.

It is to be noted, depending upon the type of apparatus embodying the present invention, it is necessitated to move a specimen only in a one-dimensional manner, and in this basic case, the above-mentioned second stage and second driving device therefore are not provided but only the first stage and the associated driving device therefor are employed. It will be self-evident that such a basic apparatus also has the same disadvantage with respect to the direction of movement of the single stage.

Heretofore, various countermeasures have been undertaken for preventing or suppressing the vibration excited by a reaction force of the force generated to move a positioning stage.

These countermeasures are enumerated as follows:
(A) The mass of the machine base c is selected to be quite large compared to the masses of the respective stages d and h.
(B) The moving speeds of the respective stages are slowed down to reduce the acceleration and deceleration.
(C) The resilient means b is additionally associated with a damer such as an oil damper to quickly damp the excited vibration.

However, every one of these countermeasures involves shortcomings and various problems would arise in practice even if any one of the countermeasures is practiced. For instance, according to the countermeasure (A) above, the weight of the machine base c must be made very heavy, and so, a problem would remain with respect to handling and manufacturing cost of the subject apparatus. According to the countermeasure (B) above, since the operation speed is reduced, the efficiency of the work for production or inspection is lowered, and so, this is basically unfavorable for practical use. According to the countermeasure (C), since the vibration is made to disappear after it has been generated, a considerable time is required before vibration is completely stopped. Moreover, due to the existence of the oil damper, there is a fear that during a normal operation of the apparatus, vibration may be transmitted to the positioning stage externally through the oil damper.

It is therefore one object of the present invention to provide a positioning stage which is free from the disadvantages or problems in the prior art as described above.

A more specific object of the present invention is to provide a positioning stage having a vibration suppressor which prevents or almost suppresses the above-mentioned vibration from occurring in a machine base.

Another object of the present invention is to provide a positioning stage having a vibration suppressor in which an oil damper is not used, the moving speed of the stages is not slowed down and the mass of the machine base is not enlarged.

Still another object of the present invention is to provide a positioning stage having a vibration suppressor, in which a plurality of stages adapted to be moved in different directions are provided and the vibration suppressor effectively suppresses the aforementioned vibration from occurring in the machine base upon any movement of the stages.

SUMMARY OF THE INVENTION

According to one feature of the present invention, there is provided a positioning stage having a vibration suppressor, which comprises a foundation, a machine base supported from the foundation by the intermediary of resilient means, a stage provided on the machine base so as to be movable in predetermined directions and adapted to be driven by a driving device provided on the machine base, and a force generator provided on the foundation and coupled to the machine base, which is adapted to generate a force having substantially the same magnitude as and an opposite direction to a force exerted upon the machine base by the driving device. The force generator provides a resistance force against acceleration or deceleration of the stage by the driving device, simultaneously with energization of the driving device, and exerts the resistance force on the machine base.

According to another feature of the present invention, there is provided a two-dimensional positioning stage, which comprises a foundation, a machine base supported from the foundation by the intermediary of resilient means, a first stage provided on the machine base so as to be movable in predetermined directions and adapted to be driven by a first driving device provided on the machine base, a first force generator provided on the foundation and coupled to the machine base, which is adapted to generate a force having substantially the same magnitude as and an opposite direction to a force exerted upon the machine base by the first driving device. The first force generator provided a resistance force against acceleration or deceleration of the first stage by the first driving device, simultaneously with energization of the first driving device, and exerts the resistance force on the machine base. A second stage provided on the first stage that is movable in a direction substantially at right angles to the direction of movement of the first stage and the second stage adapted to be driven by a second driving device provided on the first stage. A second force generator is provided on the foundation and the second force generation is coupled to the machine base. The second force generator is adapted to generate a force having substantially the same magnitude and an opposite direction to a force exerted upon the machine base via the first stage by the second driving device. The second force generator thus provides a resistance force against acceleration or deceleration of the second stage by the second driving device, simultaneously with energization of the second driving device, and exerts the resistance force on the machine base.

BRIEF DESCRIPTION OF THE DRAWING

The above-mentioned and other features and objects of the present invention will be better understood by reference to the following description of a preferred embodiment of the invention taken in conjunction with the accompanying drawings; therein.

DESCRIPTION OF THE PREFERRED EMBODIMENTS

Figure 1:
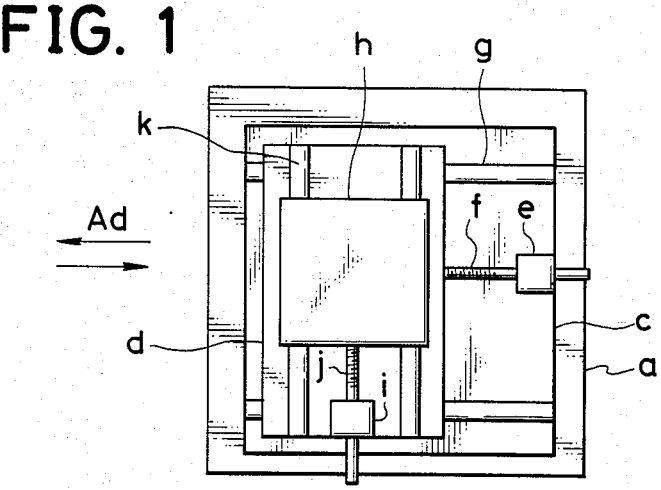
FIG. 1 is a schematic plan view showing one example of a positioning stage in the prior art to which the present invention is applied.
Figure 2:
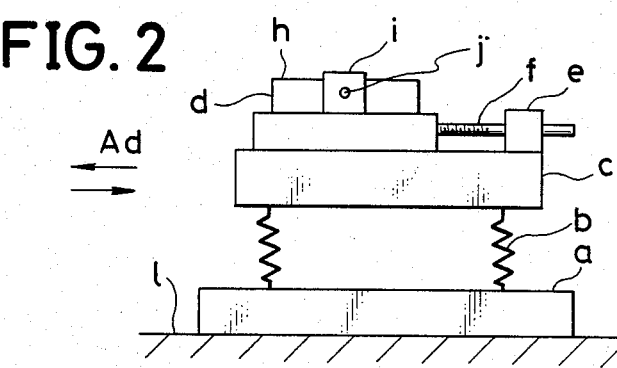
FIG. 2 is a schematic front view of the positioning stage in the prior art shown in FIG. 1.
Figure 3:
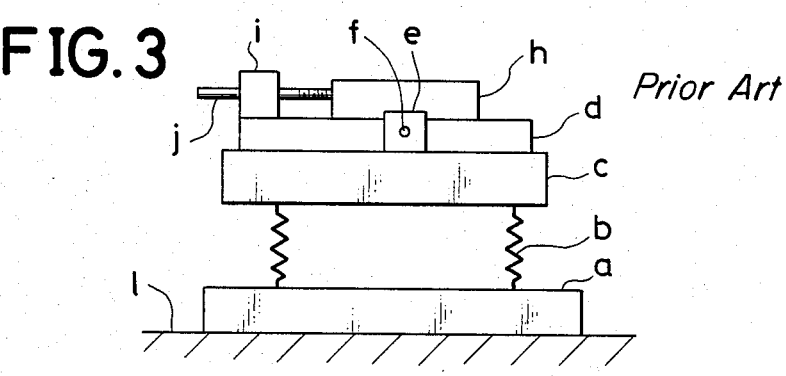
FIG. 3 is a schematic side view of the positioning stage in the prior art shown in FIGS. 1 and 2.
Figure 4:
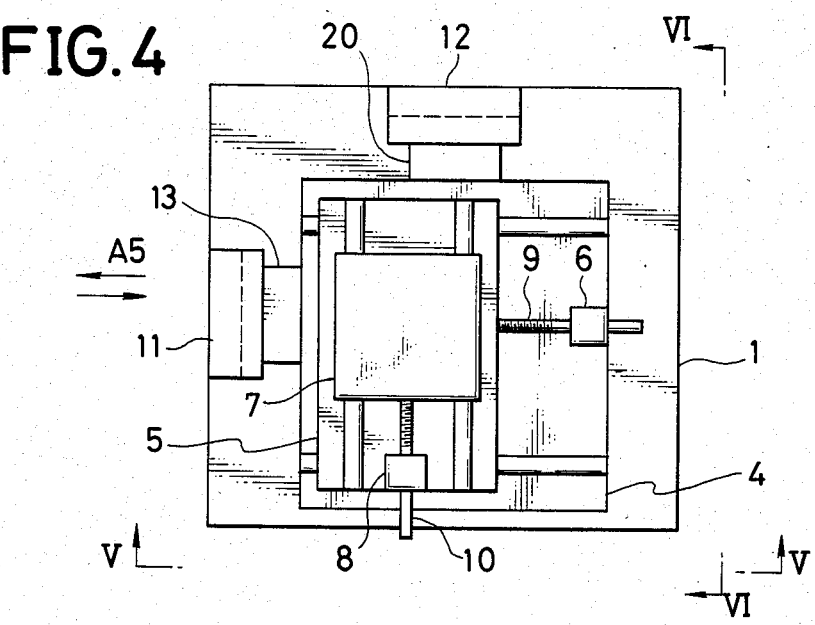
FIG. 4 is a schematic plan view showing a positioning stage having a vibration suppressor according to one preferred embodiment of the present invention.
Figure 5:
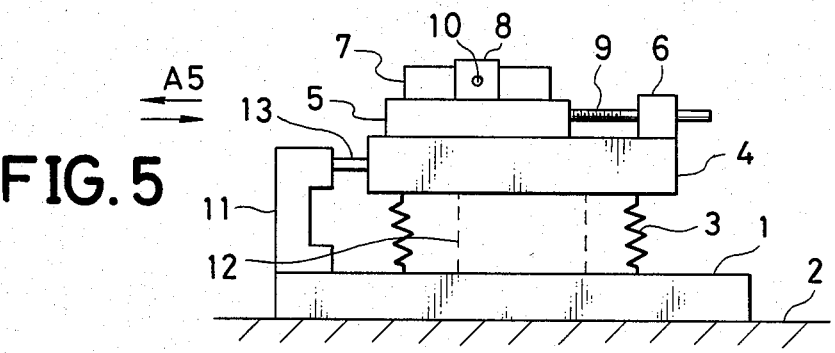
FIG. 5 is a schematic front view of the same positioning stage as viewed in the direction of arrows V.
Figure 6:
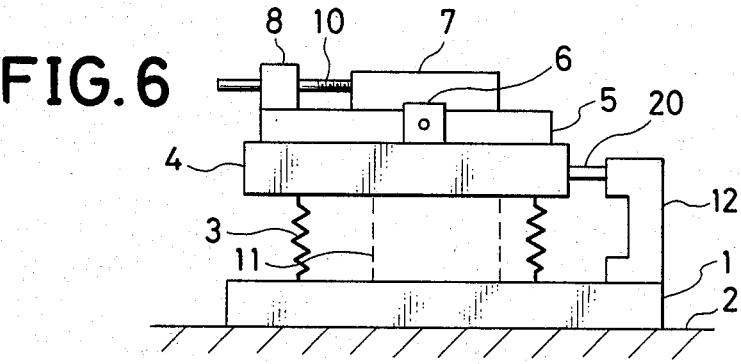
FIG. 6 is a schematic side view of the same positioning stage as viewed in the direction of arrows VI.

Referring now to the accompanying drawings, in FIGS. 4 to 6, reference numeral 1 designates a foundation which is normally installed on the ground surface 2. Reference numeral 3 designates a resilient means, and in one example of the resilient means 3, an air spring is used. On the resilient means 3 is provided a machine base 4. Reference numeral 5 designates a first stage provided on the machine base 4 so as to be movable in predetermined directions (the directions indicated by arrows A5) as driven by a first driving device 6 that is fixedly secured to the machine base 4. Reference numeral 7 designates a second stage provided on the first stage 5 so as to be movable in the directions substantially at right angles to the direction of movement of the first stage 5, and this second stage is adapted to be driven by a second driving device 8 that is fixedly secured to the first stage 5.

For the above-mentioned first and second driving devices 6 and 8, for example, D.C. servomotors can be employed. Reference numerals 9 and 10, respectively, designate screw shafts, which are theadedly engaged with the first and second stages 5 and 7, respectively, and rotated by the aforementioned first and second driving device 6 and 8, respectively, but which are constrained not to be movable in the axial direction. Accordingly, the first and second stages 5 and 7 are adapted to be moved in the axial directions of the screw shafts 9 and 10, respectively, by the operations of the first and second driving devices 6 and 8. The screw shafts 9 and 10 are arranged substantially at right angles to each other. Reference numerals 11 and 12 designate first and second force generators, respectively. Since these force generators 11 and 12 have a similar sutructure and operate in a similar manner to each other, description will be made here only with respect to one of them, for instance, with respect to the first force generator 11. The main body of this force generator 11 is disposed on the foundation 1, and a tip end of an arm 13 which forms an output end of this force generator, is fixedly secured to the machine base 4. It is to be noted that the axial direction of the output arm 13 is adjusted to be directed in the same direction as the axial direction of the first driving device 6 and the screw shaft 9 coupled thereto.

Figure 7:
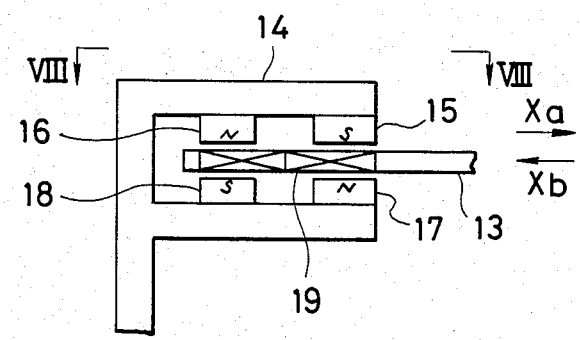
FIG. 7 is a schematic side view showing one example of a construction of a force generator provided in the positioning stage having a vibration suppressor according to the present invention.
Figure 8:
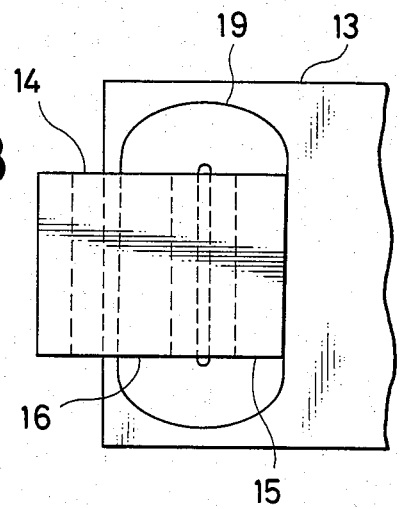
FIG. 8 is a schematic plan view of the force generator shown in FIG. 7 as viewed in the direction of arrows VIII.

With regard to the structure of the first force generator 11, for instance, it is constructed as shown in FIGS. 7 and 8. In these figures, reference numeral 14 designates a casing fixedly secured to the foundation 1, and within the casing 14 are provided permanent magnets 15, 16, 17 and 18 with their magnetic poles arrayed in the illustrated manner. Reference numeral 19 designates a coil supported by the arm 13 which is fixedly secured to the machine base 4, and the coil 19 is supported so as to be movable in the axial direction of the arm 13 within the magnetic field generated by the permanent magnets 15, 16, 17 and 18. It is to be noted that electrical connection between the coil 19 and a power supply for feeding a current to the coil 19 is omitted from illustration.

The second force generator 12 is constructed in a similar manner to the above-described first force generator 11, its main body is fixedly secured to the foundation 1, a tip end of an arm which forms an output end of the second force generator 12 is fixedly secured to the machine base 4, and the direction of the output arm 20 is adjusted to be directed in the same direction as the axial direction of the second driving device 8 and the screw shaft 10 coupled thereto.

With reference to FIGS. 4 and 5, in the case of moving the first stage 5, the first stage 5 is driven by means of the first driving device 6 via the screw shaft 9, and upon movement acceleration or deceleration in the direction of arrows A5 is applied to the first stage 5. As a result, at this moment, a reaction force against the acceleration or deceleration is exerted by the driving device 6 upon the machine base 4. However, in the positioning stage according to the present invention the above-described first force generator 11 operates simultaneously with energization of the first driving device 6. Under the operating condition of the first force generator 11, a force having substantially the same magnitude as and an opposite direction to a force exerted upon the machine base 4 by the first driving device 6 as a resistance force against acceleration or deceleration of the first stage 5 by the first driving device 6, is generated simultaneously with energization of the first driving device 6 and exerted upon the machine base 4. The above-mentioned resistance force offset action of the first force generator 11 is continuously achieved.

Then, a reaction force generated as a result of application of the above-mentioned offset force to the machine base 4 by the first force generator 11, is exerted upon the foundation. However, since the foundation 1 is fixedly installed on the ground surface 2, no problem arises.

Describing in more detail the operation of the above-described first force generator 11, since the coil 19 is accommodated within the magnetic field generated by the permanent magnets 15, 16, 17 and 18 so as to be movable in the direction at right angles to the direction of the magnetic field as shown in FIG. 7, if a D.C. current is made to flow through the coil 19, a force directed in the direction of arrow Xa or arrow Xb is generated depending upon the direction of the D.C. current. The magnitude of the force generated at this coil 19 is proportional to a product of the strength of the magnetic field and the magnitude of the current. Accordingly, assuming that the strength of the magnetic field is kept constant, it is required that a current proportional to the acceleration or deceleration of the first stage 5 during movement of the first stage 5 is passed through the coil 19. As one example of the first driving device 6, a D.C. servomotor is employed, and in this type of motor, normally a current passed through the motor is in itself proportional to the acceleration of the first stage 5, and therefore, there is no need to separately provide an acceleration sensor for detecting the acceleration of the first stage as is the case with a driving device of different type. Hence, it is only necessary to drive a D.C. current proportional to the current flowing through the D.C. servomotor from a control device not shown for the D.C. servomotor and to feed the D.C. current to the first force generator 11. Thereby the first force generator 11 is operated simultaneously with excitation of the first driving device 6. Then, the currents flowing through the first driving device 6 and the first force generator 11, respectively, are proportional to each other.

It is to be noted that while permanent magnets are used in the first force generator 11 as shown in FIG. 7, this is no more than one example of magnetic field generating means, and electromagnets could be employed in place of the permanent magnets or any other appropriate means for generating a force would be employed.

In addition, while the casing 14 supporting the permanent magnets 15, 16, 17 and 18 is fixed to the foundation 1 and the arm 13 or 20 extending from the coil 19 is fixed to the machine base 4 in the illustrated embodiment, modification could be made such that on the contrary, the arm 13 or 20 is fixed to the foundation 1 and the casing 14 is fixed to the machine base 4.

The second force generator 12 is constructed such that the relation between the second force generator 12 and the second driving device 8 may be equal to the relation between the first force generator 11 and the first driving device 7. More particularly, the second force generator 12 is constructed such that it generates a resistance force having substantially the same magnitude as and an opposite direction to a force exerted upon the machine base 4 by the second driving device 8 as a reaction force against acceleration or deceleration of the second stage 7 by the second driving device 8, simultaneously with energization of the second driving device 8 and exerts the generated force to the machine base 4. Whether the first driving device 6 and the second driving device 8 may operate separately or simultaneously, the first and second force generators 11 and 12 can respond to the operations, respectively.

While the present invention has been described above in connection with a two-dimensional positioning stage having a first stage 5 and a second stage 7 which are movable in two different directions at right angles to each other, as a matter of course, the present invention can be applied to a one-dimensional positioning stage having only one stage that is movable in one direction as its basic embodiment. In this basic case, the second stage 7, second driving device 8, second screw shaft 10, associated rails and second force generator 12 and its arm 20 would be omitted from the embodiment shown in FIGS. 4 to 6.

As described in detail above, in the illustrated positioning stage, since the first stage 5 and the second stage 7 are movable in different directions at right angles to each other and force generators for the respective directions are provided, in whatever direction the second stage 7 may be moved by simultaneous operations of the two driving devices 6 and 8, excitation of undesired vibration of the machine base 4 can be prevented by simultaneous operation of the two force generators 11 and 12 for preventing vibration corresponding to the respective driving devices 6 and 8.

In addition, even in the case where the positioning stage is formed in such manner that a movable stage therein is rotationally driven, excitation of undesired vibration can be prevented by providing a force generator adapted to generate a torque in the direction for offsetting a torque produced as a reaction against the rotational acceleration or deceleration.

According to the present invention, owing to the above-mentioned structural feature, excitation of undesired vibration in the machine base, and consequently in the respective stages of a two-dimensional positioning stage or the stage in a one-dimensional positioning stage, can be prevented.

Since many changes could be made in the above construction and many apparently widely different embodiments of the invention could be made without departing from the scope thereof, it is intended that all matter contained in the above description or shown in the accompanying drawings shall be interpreted as illustrative and not as a limitation to the scope of the invention.

What is claimed is:

1. A precision positioning device having a vibration suppressor comprising:

a foundation;

a machine base;

a means for resiliently supporting said machine base on said foundation;

a first positioning stage and a second positioning stage disposed on said machine base, said first and second positioning stages being mounted for movement in first and second predetermined directions, respectively, relative to said machine base;

a first electromechanical driving device and a second electromechanical driving device disposed on said machine base, said first and second electromechanical driving devices being adapted for driving said first and second stages in said first and second predetermined directions, respectively, said first and second driving devices thereby creating undesirable reaction forces on said base relative to said first and second predetermined directions, respectively; and a first force generator and a second force generator establishing an electromagnetic coupling between said foundation and said base, said first and second force generators each comprising:

(i) a means for generating an electromagnetic field associated with one of said foundation and said base; and (ii) a conductive coil disposed within the electromagnetic field established by said means for generating, said coil being associated with the other of said foundation and said base; whereby, a first control current and a second control current applied to the coils of said first and second force generators, respectively, provide resistive forces which are substantially equal to and in opposite directions to said undesirable reaction forces thus suppressing vibration of said precision positioning device created by said first and second electomagnetic driving devices, said first and second control currents being proportional to the driving currents applied to said first and second electromagnetic driving devices, respectively.

* * * * *